(12) United States Patent
Cecinas et al.

(10) Patent No.: US 9,421,886 B2
(45) Date of Patent: Aug. 23, 2016

(54) BUCKET SEAT WITH CHANGING KINEMATICS

(71) Applicant: EADS SOGERMA, Rochefort (FR)

(72) Inventors: Laurent Cecinas, Breuil Magne (FR); Christian Morais, La Rochelle (FR)

(73) Assignee: STELIA AEROSPACE, Rochefort (FR)

( * ) Notice: Subject to any disclaimer, the term of this patent is extended or adjusted under 35 U.S.C. 154(b) by 0 days.

(21) Appl. No.: 14/553,938

(22) Filed: Nov. 25, 2014

(65) Prior Publication Data

US 2015/0145295 A1    May 28, 2015

(30) Foreign Application Priority Data

Nov. 27, 2013    (FR) .................................... 13 61702

(51) Int. Cl.
*B60N 2/42*    (2006.01)
*B60N 2/16*    (2006.01)
*B64D 11/06*    (2006.01)
*B60N 2/10*    (2006.01)
*B60N 2/427*    (2006.01)
*B60N 2/68*    (2006.01)
(Continued)

(52) U.S. Cl.
CPC . *B60N 2/16* (2013.01); *B60N 2/10* (2013.01); *B60N 2/42709* (2013.01); *B60N 2/42718* (2013.01); *B60N 2/42736* (2013.01); *B60N 2/68* (2013.01); *B64D 11/064* (2014.12); *B64D 11/0619* (2014.12); *B64D 11/0689* (2013.01); *B64D 25/04* (2013.01); *B63B 2029/043* (2013.01)

(58) Field of Classification Search
CPC ...... B60N 2/10; B60N 2/68; B60N 2/42709; B60N 2/42736; B60N 2/42718; B60N 2/16; B64D 11/06; B64D 11/064; B64D 11/0619; B64D 11/0689; B64D 25/04
USPC ........... 297/216.1, 216.16, 216.17, 317, 322, 297/325, 338, 341–343, 344.13, 344.14
See application file for complete search history.

(56) References Cited

U.S. PATENT DOCUMENTS

| | | | | |
|---|---|---|---|---|
| 3,059,966 A | * | 10/1962 | Spielman | B60N 2/7082 188/374 |
| 3,985,388 A | * | 10/1976 | Hogan | B60N 2/163 244/122 R |
| 4,358,154 A | * | 11/1982 | Campbell | B60N 2/4242 188/372 |

(Continued)

FOREIGN PATENT DOCUMENTS

EP    2305561 A1    4/2011

*Primary Examiner* — Beth Stephan
(74) *Attorney, Agent, or Firm* — IM IP Law PLLC; C. Andrew Im

(57) ABSTRACT

A seat having a bucket and a supporting structure on which the bucket is fixed. The height of the bucket on the supporting structure is adjustable. A lower sub-assembly of the supporting structure forms a seat subframe and of which at least one bucket support is mounted movable in height following at least one lower guide rail. An upper sub-assembly of the supporting structure is assembled movable in rotation relative to the lower sub-assembly around a pivot axis which is situated close to a lower end of the lower guide rails and situated close to a lower end of the upper sub-assembly. The bucket is fixed to the bucket support in an articulated manner at the seat base and has at least one guide element fixed to the backrest and sliding in an upper guide rail of the upper sub-assembly situated above the lower guide rails.

12 Claims, 4 Drawing Sheets

(51) Int. Cl.
*B64D 25/04* (2006.01)
*B63B 29/04* (2006.01)

(56) References Cited

U.S. PATENT DOCUMENTS

| | | | | |
|---|---|---|---|---|
| 4,523,730 A | * | 6/1985 | Martin | B64D 25/04 244/122 R |
| 5,125,598 A | * | 6/1992 | Fox | B60N 2/4242 244/122 R |
| 5,273,240 A | * | 12/1993 | Sharon | B60N 2/4242 188/271 |
| 6,237,889 B1 | | 5/2001 | Bischoff | |
| 6,758,520 B2 | * | 7/2004 | Pehrson | B60N 2/3013 297/216.1 |
| 7,628,357 B2 | | 12/2009 | Mercier et al. | |
| 7,744,155 B2 | * | 6/2010 | List | B60N 2/42736 244/122 R |
| 8,408,643 B2 | | 4/2013 | Honnorat | |
| 2007/0035167 A1 | * | 2/2007 | Meyer | B60N 2/0715 297/344.19 |
| 2011/0079681 A1 | * | 4/2011 | Honnorat | B64D 11/0689 244/122 R |

* cited by examiner

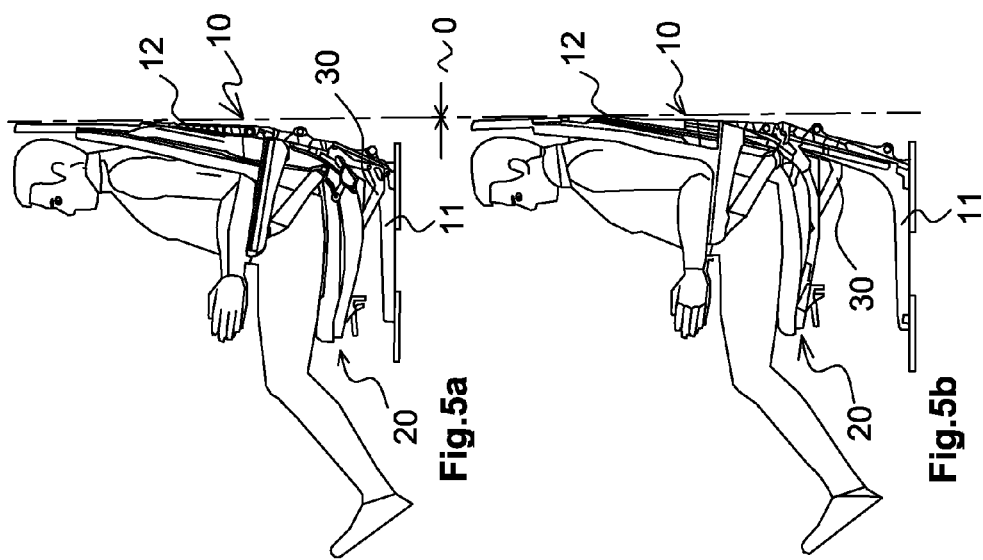
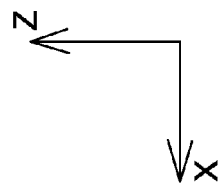
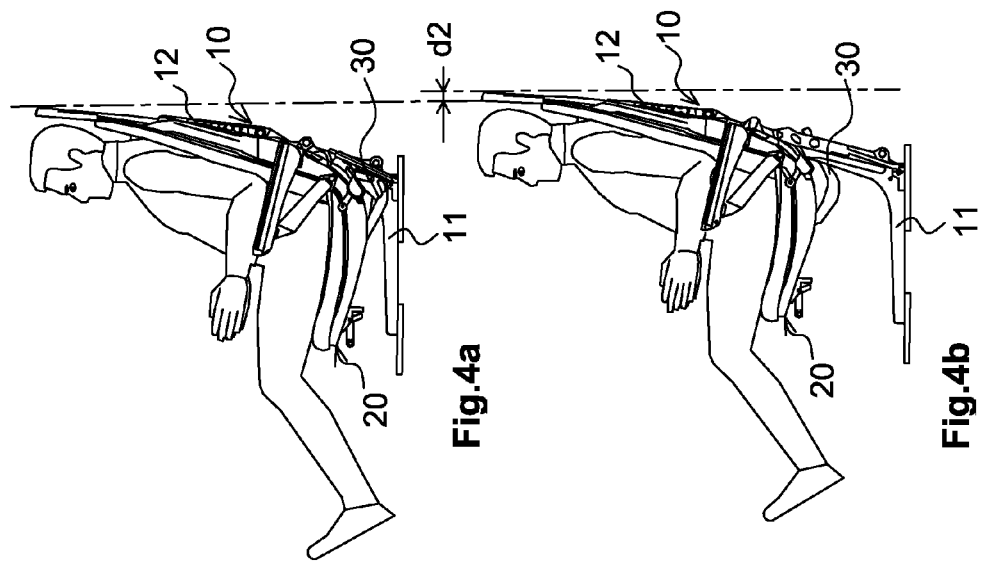

BUCKET SEAT WITH CHANGING KINEMATICS

RELATED APPLICATIONS

This application claims priority from French Patent Application No. 13 61702 filed Nov. 27, 2013, which is herein incorporated by reference in its entirety.

TECHNICAL FIELD OF THE INVENTION

The invention relates to the field of seating for transport vehicles. More particularly, it concerns a seat for a cabin of an air, sea or land transport vehicle. Such a seat is installed for example in the cabin of an aircraft.

BACKGROUND OF THE INVENTION

In general, the seats used in transport vehicles face problems because of the volume of the seat structure, which must be compatible with other structures of the vehicle, space restrictions such as for example access to emergency exits, or the installation of equipment which may be mounted temporarily, while providing a desired comfort level for the seat occupant.

Often the seat comprises adjustment elements accessible to the seat occupant, which allow the latter to adapt the ergonomics of the seat to his/her anatomy or to particular conditions. Thus often a seat is adjustable with a certain amplitude in the longitudinal position, in the height of the seat base, the recline of the backrest etc.

For example, the seat described in patent application EP 2305561 comprises a rigid bucket, the height of which is adjustable on subframe uprights which are inclined towards the rear. As a result of this arrangement, the rearmost part of the seat moves back when the bucket is raised and consequently risks interfering with a structure situated behind the seat.

In general, the movable parts of the seat must avoid interference with other vehicle structures, which leads to additional constraints which may limit the adjustment potential and lead to the implementation of complex and heavy solutions, which are in themselves sources of a loss of reliability of the seat and an increase in its production and maintenance costs.

For these various reasons, a seat adapted to the environment of a location in a given vehicle is not necessarily adapted to the environment of another vehicle, or another location in the same vehicle.

In these situations, it is then necessary either to have a different seat to suit specific situations, or to degrade the adjustment potential of the seat. For example, in passenger transport aircraft it is known to eliminate the possibility of reclining the backrest or to block this when the seat is installed in the cabin with the seat back very close to a partition.

OBJECT AND SUMMARY OF THE INVENTION

The present invention proposes a seat, the structure of which is adapted to modify the longitudinal position of a rearmost point of a seat without substantially affecting the seat adjustment potential.

The invention concerns a vehicle seat comprising a bucket, said bucket comprising a seat base and a backrest integral with or rigidly fixed to the seat base, comprising a supporting structure on which the bucket is fixed, and comprising fixings for fixing the supporting structure to a vehicle structure, for example to a vehicle floor or vehicle structural beams, a height of the bucket on the supporting structure being adjustable.

Also, the supporting structure comprises:
a lower sub-assembly which forms a seat subframe and of which at least one bucket support is mounted movable in height in a substantially vertical direction determined by one or more lower guide rails, fixed in a seat reference system, of the lower structure;
an upper sub-assembly assembled with the lower sub-assembly and movable in rotation relative to said lower sub-assembly around a pivot axis which is substantially perpendicular to a plane of symmetry XZ of the seat assembly and is situated on the lower sub-assembly in a zone close to a lower end of the lower guide rail or rails and situated on the upper sub-assembly in a zone close to a lower end of the upper sub-assembly;
the upper sub-assembly comprises one or more upper guide rails which are substantially vertical and situated above the lower guide rail or rails;
and the bucket is fixed to at least one bucket support in an articulated manner at the seat base around an axis perpendicular to the plane of symmetry of the seat assembly, and comprises guide elements fixed to the backrest and sliding in the upper guide rails.

The seat may for example be a seat for a passenger or a technical operator, or for a driver or pilot of the vehicle, and the vehicle may for example be a rolling vehicle or a surface ship or an aircraft.

Thus a seat is produced with a bucket, the seat base and backrest of which are rigidly linked, in which the horizontal forward and backward movement of a rearmost point of the seat may be limited by an adjustment of the supporting structure, limiting the effects of the bucket height adjustments on the recline angle the bucket.

To meet these needs for different recline angles, for example due to a different seat environment, the upper sub-assembly comprises at least two stable angular positions around the pivot axis: a position inclined towards the rear and an upright position. Thus the space occupied by the seat in a rear part of the seat is modified, in particular when the bucket is placed in a high position.

In one embodiment, the lower sub-assembly comprises at least two square brackets, each square bracket comprising a vertical or substantially vertical branch comprising at least one lower guide rail extending over all or part of the length of the vertical branch concerned.

The vertical branch, and in particular a longitudinal axis of the at least one lower guide rail, in practice forms an angle close to the vertical and selected to correspond to a desired forward or backward movement of the bucket as a function of its height, for example an angle between 0 and 20 degrees.

In one embodiment, the upper sub-assembly comprises at least two side posts fixed by at least one cross member, each side post comprising at least one upper guide rail.

Thus a relatively light structure is obtained which is sufficiently rigid to absorb the forces transmitted by the backrest of the bucket, and which allows modification of the inclination of the upper sub-assembly.

Locking means are for example arranged on the upper sub-assembly to immobilise the upper sub-assembly in rotation around the pivot axis relative to the lower sub-assembly, and/or are arranged on the lower sub-assembly to immobilise the upper sub-assembly in rotation about the pivot axis relative to said lower sub-assembly.

Thus it is possible to allow the rotation of the upper sub-assembly by action on the locking means, and to block this rotation at a desired angular position authorised by the locking means.

In one embodiment, the bucket support or supports each comprise at least one front arm oriented towards the front of the seat, a front end of which is articulated below the seat base.

In this arrangement, the forces linked to the weight of the bucket and in particular the weight of its occupant, who may be subjected to vertical accelerations, are absorbed below the seat base in a forward longitudinal position, in order to be transmitted to the seat subframe, by allowing a longitudinal pivoting of the bucket during modifications of the angle at which the upper sub-assembly is inclined or on a height movement of the bucket.

In one embodiment, the front arm undergoes no substantial permanent deformation when the seat is subjected to limit accelerations in use, and is deformable when the seat is subjected to accelerations in the case of a crash, so as to absorb the energy. Thus the arm undergoes, without substantial residual deformation, the acceleration which may be encountered under normal conditions of use, the deformations remaining within the elastic range of the front arm, and absorbs energy by irreversible deformations in the case of crash acceleration, allowing limitation of the acceleration suffered by the seat occupant.

In another embodiment which may be combined with the previous embodiment, the front arm comprises means for dynamic absorption of energy in the case of a crash, for example connecting rods absorbing the energy by friction or deformation.

Thus the design of the arm is simplified, at least part of the energy linked to crash accelerations being absorbed by the dynamic absorption means.

According to one embodiment, the upper sub-assembly comprises an angular position about the pivot axis in which said upper sub-assembly can be locked relative to the lower sub-assembly, such that on vertical movements of the bucket, a rearmost part of the seat, in the locked position of the upper sub-assembly, is substantially fixed relative to the lower sub-assembly in a longitudinal direction of the seat, towards the front or rear of the seat, in a seat reference system.

The seat therefore has a stable position of the upper sub-assembly for which the rear limit of the seat is substantially fixed when the height of the bucket is modified.

Because of the slight pivoting of the bucket towards the rear when it is lowered in the case of a crash, the passenger is also more reclined towards the rear, which limits the risk of sliding forward on the bucket under the effect of acceleration due to the crash, a phenomenon known as submarining.

BRIEF DESCRIPTION OF THE DRAWINGS

The description and drawings of a particular embodiment of the invention will clarify the aims and objectives of the invention. It is clear that this description is given as an example and has no limitative character.

In the drawings:

FIGS. 4a and 4b illustrate, in profile view, the seat in FIG. 1 in a position reclined towards the rear of the bucket as on FIG. 3a, in the low (FIG. 4a) and high (FIG. 4b) positions, and show the difference in the position of the seat back;

FIGS. 5a and 5b illustrate, in profile view, the seat in FIG. 1 in the upright position of the bucket as shown in FIG. 3b, in the low (FIG. 5a) and high (FIG. 5b) position, and show the alignment of the positions of the seat back.

FIG. 1 shows, viewed in perspective from the rear and from a low angle, a seat 100 according to the invention.

DETAILED DESCRIPTION OF THE EMBODIMENTS

Figure 1:
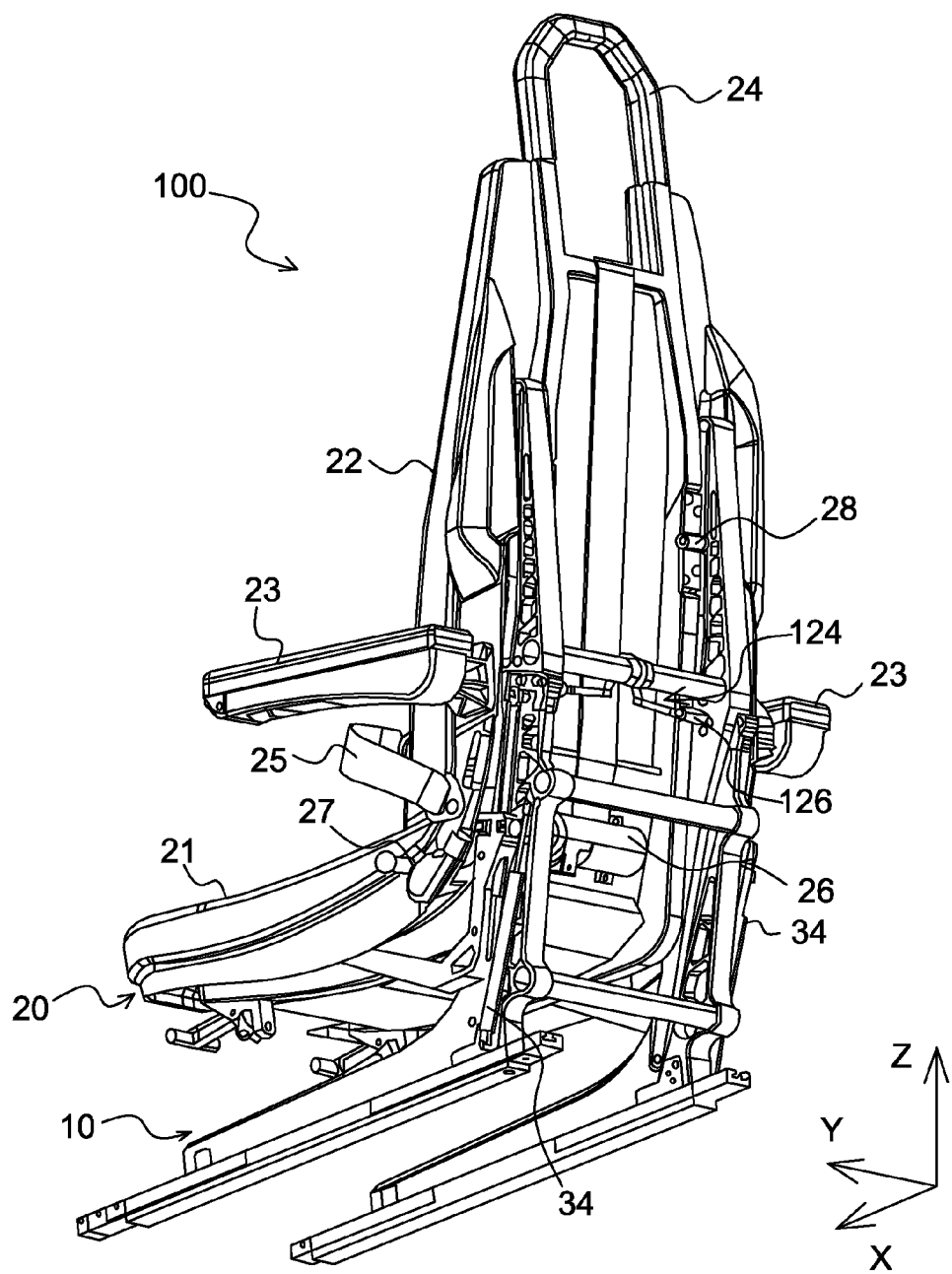
FIG. 1 shows, in a perspective view from the rear, an example of the seat according to the invention.

In the description which follows, a seat reference system X, Y, Z is used for the respective longitudinal, transverse and vertical axes of the seat. Following the longitudinal axis X, terms such as "front", "rear", "forward", "backward", etc. are used, and along the vertical axis Z terms such as "upper", "lower", "above", "below" etc., with reference to the normal meaning which would be given by an occupant of the seat.

The seat has a vertical plane of symmetry XZ of the assembly.

The seat 100 principally comprises a supporting structure 10 holding a bucket 20 intended to receive an occupant in the seated position.

The bucket 20 principally comprises a shell, the rigid structure of which forms a seat base 21 and a backrest 22.

This type of bucket is known. It can be produced for example from composite materials, which allows ergonomic forms to be obtained for the seat base and backrest with high rigidity and a relatively low mass.

Also, various accessories which are generally associated with seats, such as aircraft seats, are fixed to the rigid bucket: in particular seat base and backrest cushions, arm rests 23, a head rest 24, a safety harness 25, in the example shown a shoulder harness reel 26, means 27 for locking/unlocking the movements of the seat or bucket 20 relative to the supporting structure 10.

Figure 2:
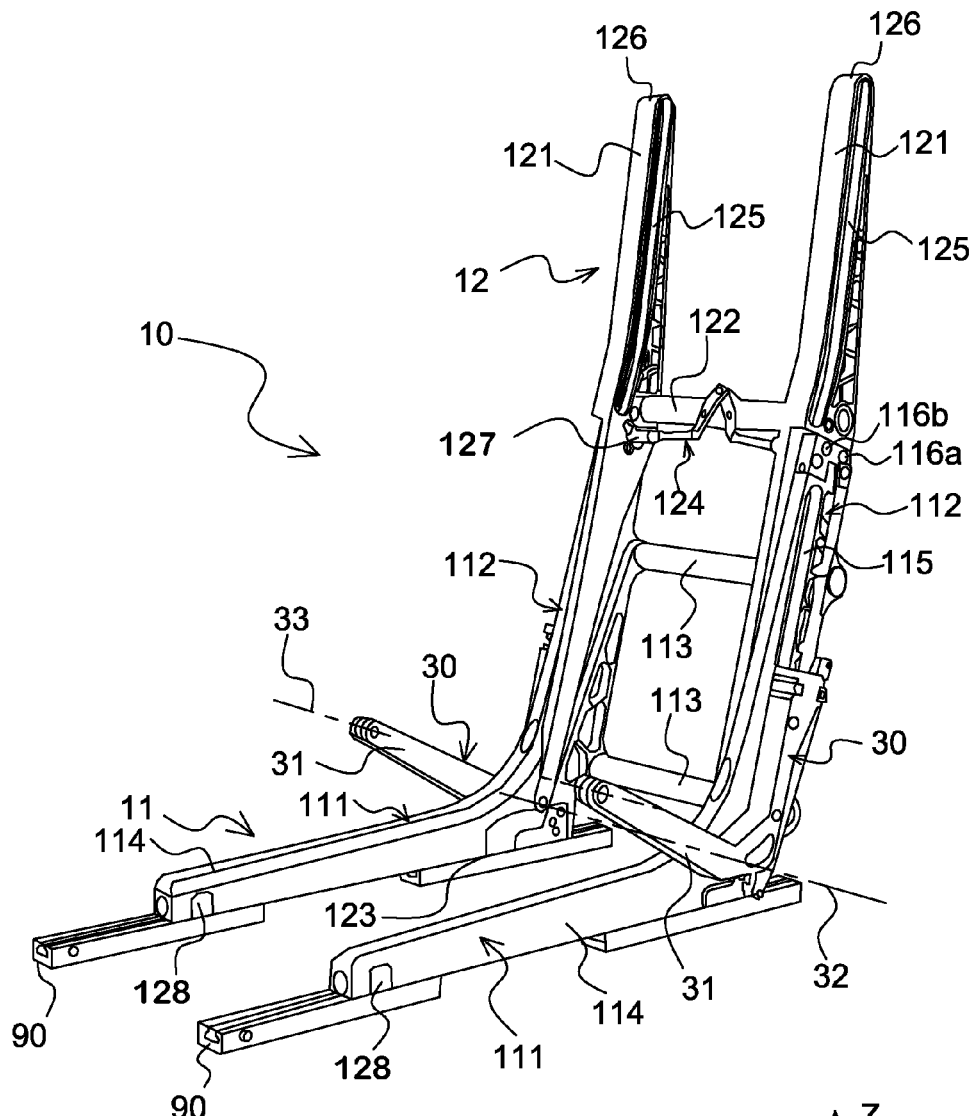
FIG. 2 shows, in a perspective view from the front, the supporting structure of the bucket without the bucket of the seat in FIG. 1.

The supporting structure 10 is shown on FIG. 2 in a perspective view without the bucket and without its accessory elements.

The supporting structure 10 principally comprises a lower sub-assembly 11 and an upper sub-assembly 12.

The lower sub-assembly 11 is a rigid structure with two lateral square brackets 111, the two square brackets being arranged substantially symmetrically in relation to a vertical plane of symmetry XZ of the seat, close to the side edges of the seat. Each square bracket 111 comprises a horizontal branch 114, substantially horizontal in the seat reference system, and a vertical branch 112, substantially vertical or slightly inclined, generally between 0° and 20°, in the seat reference system. The two square brackets 111 are fixed together by connecting bars 113 arranged to give the lower sub-assembly 11 a rigidity suitable for the forces to which it is exposed on use of the seat.

The lower sub-assembly 11 forms seat feet comprising fixings 128 which are arranged on the horizontal branches 114 of the square brackets 111 so as to fix the seat via said fixings to a vehicle structure, in the example shown represented by floor rails 90.

Each vertical branch 112 comprises a lower guide rail 115, a longitudinal axis of which is oriented in a substantially vertical direction.

A bucket support 30 is arranged movably on the square bracket 111 to which it is attached, such that it can be moved in height along the vertical branch 112 of the square bracket concerned.

Each bucket support 30 comprises a front arm 31 oriented towards the front so as to extend below the seat base 21 of the bucket 20. Advantageously, the arm is designed not to undergo substantial permanent deformation under normal conditions of use of the seat, i.e. in particular under the limit conditions of acceleration to which it is exposed in use, and to absorb the energy by deforming in the case of crash acceleration in order to limit the acceleration experienced by the seat occupant. In one embodiment (not shown), the arm has sufficient rigidity not to be deformed substantially under the acceleration associated with a crash, and to transmit the forces to specific energy absorbers mounted on the seat or supporting the seat. In another embodiment (not shown), the arm integrates means for dynamic absorption of the energy in the case of a crash, for example connecting rods absorbing the energy by friction or by deformation.

The bucket support 30 is movable in the direction determined by the lower guide rail 115 of the vertical branch 112 of the corresponding square bracket 111, the movement in the substantially vertical direction determined by the lower guide rail 115 being the only degree of movement of the bucket support in the seat reference system.

In the embodiment example illustrated, each bucket support 30 comprises two rollers or skids, not shown on FIG. 2, which are offset in the longitudinal direction of the lower guide rail 115 and slide in an adapted fashion in a groove of said lower guide rail, in order to allow said bucket support to be movable in a longitudinal direction of the lower guide rail, substantially vertically, while immobilising the bucket support in the other directions of movement and in rotation.

Each front arm 31 is fixed to the bucket 20 by an articulated connection to the seat base 21, about an axis 33 parallel to the transverse axis Y of the seat reference system.

The upper sub-assembly 12 comprises two side posts 121, rigidly connected by at least one cross member 122 and arranged substantially vertically.

The upper sub-assembly 12 is assembled to the lower sub-assembly 11 movably in rotation about a pivot axis 32 oriented along axis Y, transverse to the seat reference system.

The pivot axis 32 is situated on the lower sub-assembly 11 in a zone of each square bracket 111 close to the connection between the horizontal branch 114 and the vertical branch 112 of the square bracket concerned, in practice in a zone close to a lower end of the lower guide rails 115 and also close to the floor of the vehicle to which the seat is attached, which zone is able to absorb the forces introduced into the seat at the pivot axis 32.

The pivot axis 32 is also situated on the upper sub-assembly 12 in a zone close to the lower end 123 of each of the side posts 121.

As a result of this configuration of the lower and upper sub-assemblies, the upper sub-assembly 12 is articulated via a lower end of said upper sub-assembly at a distance from the upper guide rails.

A spacing between the outer edges of the side posts 121 of the upper sub-assembly 12 corresponds, apart from a functional play and at least over a height common to the lower and upper sub-assemblies, to a spacing between the inner edges of the vertical branches 112 of the square brackets 111 of the lower sub-assembly.

According to this arrangement, in a substantially vertical position, the side posts 121 are able to move in rotation about the pivot axis 32 between the square brackets 111 and assume positions which are inclined to varying degrees in relation to the strict vertical determined by the orientation of axis Y and substantially parallel to the vertical branches 112 of said square brackets.

A locking device 124 is arranged to release in the unlocked position, and to immobilise in the locked position, the upper sub-assembly 12 in rotation about the pivot axis 32 relative to the lower sub-assembly 11.

The locking device 124 ensures immobilisation of the upper sub-assembly 12 in at least two different angular positions around the pivot axis, the side posts 121 of said upper sub-assembly determining at least two inclinations of said upper assembly.

Each side post 121 also comprises at least one upper guide rail 125 in an upper part of said side post.

As will be understood later, the lengths of the lower guide rails 115 and upper guide rails 125 are such that the trolleys, rollers or slider skids moving in said lower rails and upper rails have substantially the same travel.

According to the arrangement just described of the structure 10 and its main constituent elements, the upper guide rails 125 may be inclined by a rotation about the pivot axis 32 relative to the lower guide rails 115, which consequently, because of the position of said pivot axis, causes the upper guide rails 125 to move in the longitudinal direction X, the lower guide rails 115 being immobile in the seat reference system.

Pivoting the upper sub-assembly 12 towards the front has the consequence of moving the guide rails towards the front, an upper end 126 of each of the side uprights 121 advancing initially, in the seat reference system, by h×sin(alpha), where h is the distance of the upper end 126 from the pivot axis 32, and alpha is the value of the angle through which the upper sub-assembly has pivoted. It must be understood here that angle alpha concerned is sufficiently small for its cosine to be considered roughly as substantially equal to 1.

Because of the downwardly offset position of the pivot axis 32 relative to the upper guide rails 125, said upper guide rails are moved globally in the longitudinal direction X by the rotation of the upper sub-assembly 12.

Looking again at FIG. 1, the bucket 20 is fixed to the structure 10 firstly by the front arms 31 of the bucket supports 30 and secondly by the guide elements 28.

Each front arm 31 holds the bucket 20 at the lower sub-assembly 11 by an articulated connection with the seat base 21, about an axis 33 parallel to the transverse axis Y of the seat reference system.

The guide elements 28 are fixed to the backrest 22 and comprise rollers or skids arranged to move in grooves of the upper guide rails 125.

In this arrangement, when the bucket 20 is moved in height, the bucket supports 30 follow a fixed trajectory in the seat reference system determined by the lower guide rails 115, and the guide elements 28 follow a trajectory determined by the upper guide rails 125 and therefore dependent on the angle at which the upper sub-assembly 12 is inclined relative to the lower sub-assembly 11.

Except in the particular case where the trajectories determined by the lower guide rails and by the upper guide rails are parallel, the movement of the seat in height leads to an angular movement of the seat in a longitudinal plane determined by the relative position of the lower guide rails 115 and the upper guide rails 125, which occurs without constraint thanks to the articulated connection of the seat base 21 on the front arms 31 and the connection of the guide elements 28 fixed to the backrest 22, allowing rotation of the backrest relative to the upper sub-assembly 12.

For example the guide rail elements 28 are rollers, the axes of which are aligned and parallel to the transverse axis Y. For example the guide rails 28 are skids, mounted turning on aligned axes parallel to the transverse axis Y.

Thus when the upper guide rails 125 are more inclined towards the rear than the lower guide rails 115, the backrest moves back more at the connection with the guide elements 28 than the seat base at the connection with the front arms 31 when the bucket is mounted, which has the effect of pivoting the bucket integrally towards the rear when it is raised.

The seat in this case is more reclined towards the rear in the high position than in the low position.

Conversely, when the upper guide rails 125 are less inclined towards the rear than the lower guide rails 115, for example vertical, the seat backrest moves back less at the connection with the guide elements 28 than the seat base at the connection with the front arms 31 when the bucket is rised, which has the effect of causing the bucket to pivot integrally forward when it is raised.

The seat in this case is less reclined towards the rear in the high position than in the low position.

The seat comprises locking means, not shown on the drawings, to allow the vertical movements of the bucket 20 and to immobilise the bucket in the desired height position. Such locking means are known in the field of seats, and the weight of the seat and its occupant is at least partially compensated where applicable by spring elements such as the force compensation rods 34.

The means 124 for locking the rotation of the upper sub-assembly 12 relative to the lower sub-assembly 11 consists for example of sliding studs 127 on the upper sub-assembly which are engaged in bores, set to avoid undesirable play, for example a rear bore 116a and a front bore 116b, of the lower sub-assembly in order to block rotation about the pivot axis 32.

Figure 3A:
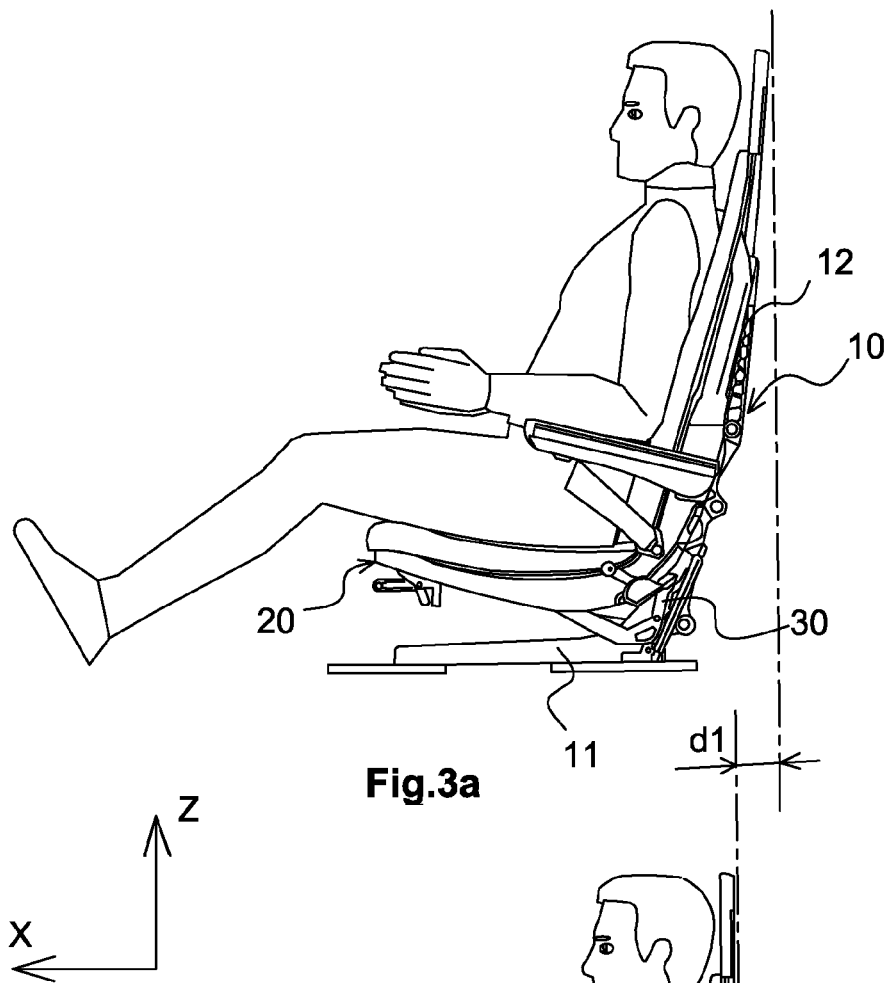
FIG. 3a illustrates, in a side view, the seat in FIG. 1 in a low position, reclined towards the rear of the bucket.
Figure 3B:
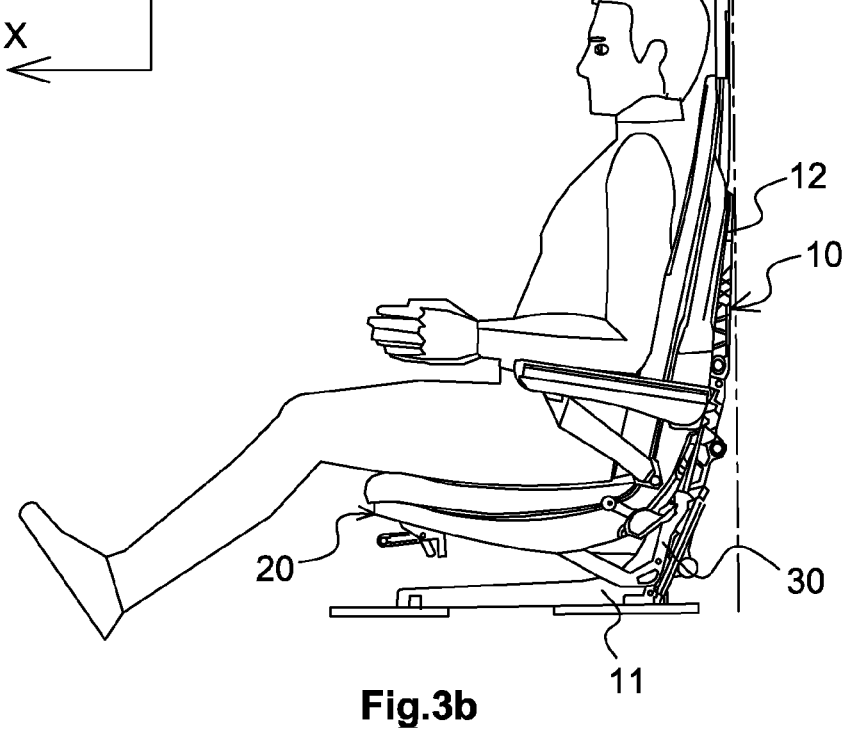
FIG. 3b illustrates, in a side view, the seat in FIG. 1 in the same low position as in FIG. 3a, with a smaller recline angle towards the rear of the bucket, and shows the difference in the position of the seat back.

In the configurations of the seat 100 shown on FIGS. 3a and 3b, a surface supporting a seat occupant on the backrest 22 is slightly reclined towards the rear for ergonomic reasons.

On FIG. 3a, the upper sub-assembly 12 is in a position pivoted towards the rear relative to its position on FIG. 3b, the bucket being set to the same height position, the low position in this case.

In the case shown, the pivot is of an angle of around two degrees only.

One effect visible on comparison of FIG. 3a and FIG. 3b shows the advance of a rear limit of the seat in the seat reference system by distance d1.

The movement of the rearmost limit of the seat is shown by a dotted line as a function of the angle at which the upper sub-assembly is immobilised, the seat being shown in FIGS. 3a and 3b in the same position of the fixings in axis X.

When the upper sub-assembly 12 and its upper guide rails 125 are in a position inclined towards the rear because of a selected inclination angle about the pivot axis, which is the case in FIGS. 4a and 4b, the adjustment of the bucket 20 to a high position (FIG. 4b) relative to a low position (FIG. 4a) has the consequence that the rear limit of the seat moves back in the seat reference system by a distance d2. This backward movement occurs although the bucket pivots by the order of two and a half degrees forward in the example shown, because of its change in height position.

When the upper sub-assembly 12 and the upper guide rails 125 are in an upright position because of the selected inclination angle, which is the case in FIGS. 5a and 5b, when the bucket 20 is in the high position (FIG. 5b) relative to the low position (FIG. 5a), the rear limit of the seat will move back less than in the previous case, or by a suitable choice of rotation angle will not move back at all significantly, as in the example shown.

It must be noted that, in the context of the inclination angles considered for the upper sub-assembly 12 around the pivot axis 32, the desired movement of the upper guide rails 125 is obtained with small angles of rotation of a few degrees, generally less than ten degrees, which allows the lower and upper guide rails to be held substantially parallel or with substantially a same angle relative to each other, and consequently the amplitude of tilt of the bucket when the bucket is raised or lowered is only slightly affected.

The seat which has just been described in detail is a non-limitative example of the invention.

The person skilled in the art could produce variants of the supporting structure in particular.

Thus the exemplary embodiment of the supporting structure has a configuration in which each of the upper and lower sub-assemblies has a left/right symmetrical structure of the working parts with two square brackets, two uprights, two bucket supports etc.

Although such a configuration has advantages in terms of symmetry for transmission of forces and in terms of safety in the case of failure of certain elements, the person skilled in the art could transfer the principles of the invention to non-duplicated axial structures, for example a seat with a single beam type subframe, or two sub-assemblies with more than two working elements, while the detailed description only illustrates two.

The number and form of the lower and upper guide rails may also differ from those described or illustrated insofar as the bucket support(s) or the backrest guide element(s) are each guided along the desired trajectory during the height movement of the bucket.

Thus a seat 100 is obtained, the rigid bucket 20 of which may be adjusted in height and adjusted in inclination towards the back or the front, in which the main forces on the bucket are absorbed at the structure 10 on the rigid lower sub-assembly 11 which is fixed directly to a vehicle structure. Also the positioning of the locking means 124 in an upper part of the lower sub-assembly 11 allows no torsion forces to be introduced at the pivot axis 32 in the case of forward or backward forces.

The seat 100 therefore proves lighter and less costly to produce and maintain and comprises few mobile parts.

In particular, the position in which the bucket 20 is adjusted in inclination towards the front allows elimination or at least limitation of the backward movement of the rearmost part of the seat 100 when the seat is adjusted in height, without advancing the bucket of the seat which is held at the seat base 21, and hence means that there is no loss of height adjustment, which is important for adapting the position of the seat as a function of the size of the occupant when the rearmost limit of the seat must not move back.

This absence or limitation of backward movement is important when obstacles, for example a partition, are located behind the seat.

It is thus possible to use a same model of seat 100 irrespective of whether or not this is constrained by obstacles situated behind the seat, or the seat model must be mounted on different vehicles, or the seat model must be mounted at different sites in the same vehicle.

When a seat 100 is not constrained by a rear obstacle, the seat may be set with an angle giving an recline angle of the bucket towards the rear.

When the seat 100 is constrained by a rear obstacle, the seat is set with an angle of the upper sub-assembly 12 giving a reduced inclination towards the rear.

The adjustment of the forward or backward rotation angle is achieved by unlocking the locking means 124 to release the rotation of the upper sub-assembly 12 relative to the lower sub-assembly 11, and to lock said locking means again when the upper sub-assembly has been brought to the desired position.

The unlocking and locking of the locking means are implemented for example by operators in charge of installation of the seats or their maintenance. The unlocking or locking of the locking means may also be implemented by a user of the seat, for example for technical reasons or by personal choice if the seat does not risk mechanical interference with other elements of the vehicle.

In a particular embodiment, the adjustment of the seat 100 is modified as a function of a variable environment of the vehicle in which the seat is installed.

For example the seat is installed close to a partition located behind the seat, with a separation distance which allows use of the seat with an inclination of the upper sub-assembly towards the rear in a first configuration of the partition, but which does not allow this inclination in a second configuration of the partition, for example when the partition is thickened by a temporary armor plate.

The invention claimed is:

1. A seat for a vehicle, comprising:
   a bucket comprising a seat base and a backrest integral with or rigidly fixed to the seat base;
   a supporting structure on which the bucket is fixed;
   fixings to fix the supporting structure to a vehicle structure, a height of the bucket on the supporting structure being adjustable;
   the supporting structure comprises:
      a lower sub-assembly which forms a seat subframe and of which at least one bucket support is mounted movable in height in a substantially vertical direction determined by at least one lower guide rail, fixed in a seat reference system, of a lower structure;
      an upper sub-assembly assembled with the lower sub-assembly and movable in rotation relative to the lower sub-assembly around a pivot axis which is substantially perpendicular to a plane of symmetry XZ of a seat assembly, the pivot axis is situated on the lower sub-assembly in a zone close to a lower end of said at least one lower guide rails and the pivot axis is situated on the upper sub-assembly in a zone close to a lower end of the upper sub-assembly;
      the upper sub-assembly comprises at least one upper guide rail which is substantially vertical and situated above said at least one lower guide rail;
      the bucket is fixed to the bucket support in an articulated manner at the seat base around an axis perpendicular to the plane of symmetry of the seat assembly; and
      the bucket comprises at least one guide element fixed to the backrest and sliding in said at least one upper guide rail.

2. Seat according to claim 1, wherein the upper sub-assembly comprises at least two stable angular positions around the pivot axis: a position inclined towards the rear, and an upright position.

3. Seat according to claim 1, wherein the lower sub-assembly comprises two square brackets, each square bracket comprising a vertical or substantially vertical branch comprising at least one lower guide rail extending over all or part of the length of said vertical branch.

4. Seat according to claim 1, wherein the upper sub-assembly comprises at least two side posts fixed by at least one cross member, each side post comprising at least one upper guide rail.

5. Seat according to claim 1, further comprising a locking device arranged on the upper sub-assembly to immobilise the upper sub-assembly in rotation around the pivot axis relative to the lower sub-assembly.

6. Seat according to claim 1, further comprising a locking device arranged on the lower sub-assembly to immobilise the upper sub-assembly in rotation around the pivot axis relative to the lower sub-assembly.

7. Seat according to claim 1, further comprising a locking device arranged on the upper and lower sub-assemblies to immobilise the upper sub-assembly in rotation around the pivot axis relative to the lower sub-assembly.

8. Seat according to claim 1, wherein the bucket support comprises at least one front arm oriented towards the front of the seat, a front end of which is articulated below the seat base.

9. Seat according to claim 8, wherein the front arm undergoes no substantial permanent deformation when the seat is subjected to limited accelerations in use, and is deformable when the seat is subjected to accelerations in a case of a crash, so as to absorb the energy.

10. Seat according to claim 8, wherein the front arm comprises dynamic energy absorbers to absorb energy by friction or deformation in a case of a crash.

11. Seat according claim 10, wherein the dynamic energy absorbers are connecting rods.

12. Seat according to claim 1, wherein the upper sub-assembly comprises an angular position around the pivot axis in which the upper sub-assembly can be locked relative to the lower sub-assembly, such that on vertical movements of the bucket, a rearmost part of the seat is substantially fixed in relation to the lower sub-assembly in a longitudinal direction of the seat, towards the front or rear of the seat, in a seat reference system.

* * * * *